(12) United States Patent
Stone et al.

(10) Patent No.: US 6,934,781 B2
(45) Date of Patent: Aug. 23, 2005

(54) SYSTEM AND METHOD FOR EFFECTIVELY PERFORMING ISOCHRONOUS DATA TRANSFERS

(75) Inventors: Glen D. Stone, Campbell, CA (US); Bruce A. Fairman, Woodside, CA (US); Scott D. Smyers, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/226,025

(22) Filed: Aug. 22, 2002

(65) Prior Publication Data

US 2003/0005194 A1 Jan. 2, 2003

Related U.S. Application Data

(63) Continuation of application No. 09/383,490, filed on Aug. 26, 1999, now Pat. No. 6,463,489.

(51) Int. Cl.$^7$ ............................................. G06F 13/362
(52) U.S. Cl. ..................... 710/118; 710/116; 370/447
(58) Field of Search ..................... 710/113–118, 107, 710/124, 125, 240–242; 370/447; 711/158, 151

(56) References Cited

U.S. PATENT DOCUMENTS

| | | | |
|---|---|---|---|
| 4,897,833 A | * | 1/1990 | Kent et al. .................. 370/447 |
| 5,487,170 A | * | 1/1996 | Bass et al. .................. 710/244 |
| 5,758,105 A | * | 5/1998 | Kelley et al. ............... 710/113 |
| 6,032,211 A | * | 2/2000 | Hewitt ........................ 710/107 |
| 6,134,625 A | * | 10/2000 | Abramson .................. 710/241 |
| 6,298,424 B1 | * | 10/2001 | Lewchuk et al. ........... 711/158 |
| 6,463,489 B1 | * | 10/2002 | Stone et al. ................ 710/107 |

FOREIGN PATENT DOCUMENTS

EP 704807 A1 * 4/1996 ......... G06F/13/364

* cited by examiner

Primary Examiner—Mark H. Rinehart
Assistant Examiner—Clifford Knoll
(74) Attorney, Agent, or Firm—Gregory J. Koerner; Redwood Patent Law

(57) ABSTRACT

A system and method for effectively performing isochronous data transfers comprises a network device including an input/output (I/O) bus that is coupled to an input/output (I/O) node and an isochronous-capable network interface. The network interface and the I/O node may send requests to an arbiter for control of the I/O bus to perform a data transfer operation. In accordance with the present invention, an arbiter filter is interposed between the arbiter and both the network interface and the I/O node to filter respective requests for control of the I/O bus. The network interface advantageously provides an isochronous request to the arbiter filter to thereby de-assert conflicting requests so that the network interface may effectively perform a time-sensitive isochronous data transfer.

40 Claims, 8 Drawing Sheets

SYSTEM AND METHOD FOR EFFECTIVELY PERFORMING ISOCHRONOUS DATA TRANSFERS

CROSS REFERENCE TO RELATED APPLICATIONS

This Application is a Continuation Application of, and claims the benefit of, U.S. Non-Provisional Application No. 09/383,490, entitled "System And Method For Effectively Performing Isochronous Data Transfers," which was filed on Aug. 26, 1999 now U.S. Pat. No. 6,463,489. The related Applications are commonly assigned.

BACKGROUND OF THE INVENTION

1. Field of the Invention

This invention relates generally to techniques for performing data transfer operations, and relates more particularly to a system and method for effectively performing isochronous data transfers.

2. Description of the Background Art

Implementing effective methods for transferring data between electronic devices is a significant consideration for designers and manufacturers of contemporary electronic devices. An electronic device in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Effectively managing data transfer operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Network size is also a factor that affects the management of data transfer operations in an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to transfer data to and from various remote devices across the electronic network. However, successfully managing a substantial number of electronic devices across a single network may provide significant benefits to a system user.

Furthermore, enhanced device capability to perform various advanced memory transfer operations may provide additional benefits to a system user, but may also place increased demands on the control and management of the various devices in the electronic network. For example, an enhanced electronic network that effectively accesses, processes, and displays digital television programming may benefit from efficient network communication techniques because of the large amount and complexity of the digital data involved.

One type of data transfer that may occur in an electronic network is an isochronous data transfer. Isochronous data transfers include the guaranteed handling of data that arrives in a time-based stream at regular intervals called cycles. Isochronous data transfers are typically used for time-sensitive applications. For example, video or audio data being transmitted across a network typically needs to arrive at a display device in an uninterrupted flow with appropriate timing.

Due to growing demands on system resources and substantially increasing data magnitudes, it is apparent that developing new and effective methods for transferring data is a matter of significant concern for the related electronic technologies. Therefore, for all the foregoing reasons, implementing effective methods for transferring data between electronic devices remains a significant consideration for designers, manufacturers, and users of contemporary electronic devices.

SUMMARY OF THE INVENTION

In accordance with the present invention, a system and method are disclosed for effectively performing isochronous data transfers. In one embodiment, the invention preferably comprises a computer device that includes a network interface that is preferably coupled to both an input/output (I/O) bus and a network bus to serve as an interface for transferring isochronous data and asynchronous data between the computer device and an electronic network.

In addition, at least one input/output (I/O) node is also coupled to the I/O bus. In certain embodiments, the I/O bus may only be accessed by a single given I/O device (such as the network interface or the I/O node) at any particular time to transfer information between a device memory and the given I/O device. Therefore, in order to gain control of the I/O bus for a data transfer operation, the network interface or the I/O node may request control of the I/O bus from an arbiter in an I/O bus bridge within the computer device. In accordance with an arbitration algorithm, the arbiter may then responsively grant control of the I/O bus to the appropriate requesting I/O device.

In one embodiment, the I/O node may transmit a Request A In to an arbiter filter. The arbiter filter responsively filters the Request A In and then propagates a corresponding Request A Out to the arbiter. The I/O node preferably utilizes the Request A In to request control of the I/O bus for a non-isochronous data transfer. Similarly, a network interface may transmit a Request B In to the arbiter filter. The arbiter filter responsively filters the Request B In, and then propagates a Request B Out to the arbiter. The network interface preferably utilizes the Request B In to request control of the I/O bus for a non-isochronous data transfer.

In accordance with the present invention, the network interface (or any other isochronous-capable I/O device) may also advantageously transmit an isochronous transfer request (iso request) to arbiter filter. The network interface advantageously utilizes the iso request and the arbiter filter to establish priority over the Request A In and/or the Request B In when seeking access to the I/O bus for performing a time-sensitive isochronous data transfer.

In accordance with the present invention, the operation of the arbiter filter and the iso request are transparent to the arbiter and the I/O node. In addition, the arbiter filter may readily be added to the circuitry of the computer device with no changes, or only minimal changes to the basic system design. In certain embodiments, standard components and devices may therefore be utilized to economically and effectively implement the computer device. The present invention thus efficiently implements a system and method for effectively performing isochronous data transfers.

DETAILED DESCRIPTION OF THE PREFERRED EMBODIMENT

The present invention relates to an improvement in data transfer operations. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for effectively performing isochronous data transfers, and includes a network device having an input/output (I/O) bus that is coupled to an input/output (I/O) node and an isochronous-capable network interface. The network interface and the I/O node may send requests to an arbiter for control of the I/O bus to perform a data transfer operation. In accordance with the present invention, an arbiter filter is interposed between the arbiter and both the network interface and the I/O node to filter respective requests for control of the I/O bus. The network interface advantageously provides an isochronous request to the arbiter filter to thereby de-assert conflicting requests so that the network interface may effectively perform a time-sensitive isochronous data transfer.

Figure 1:
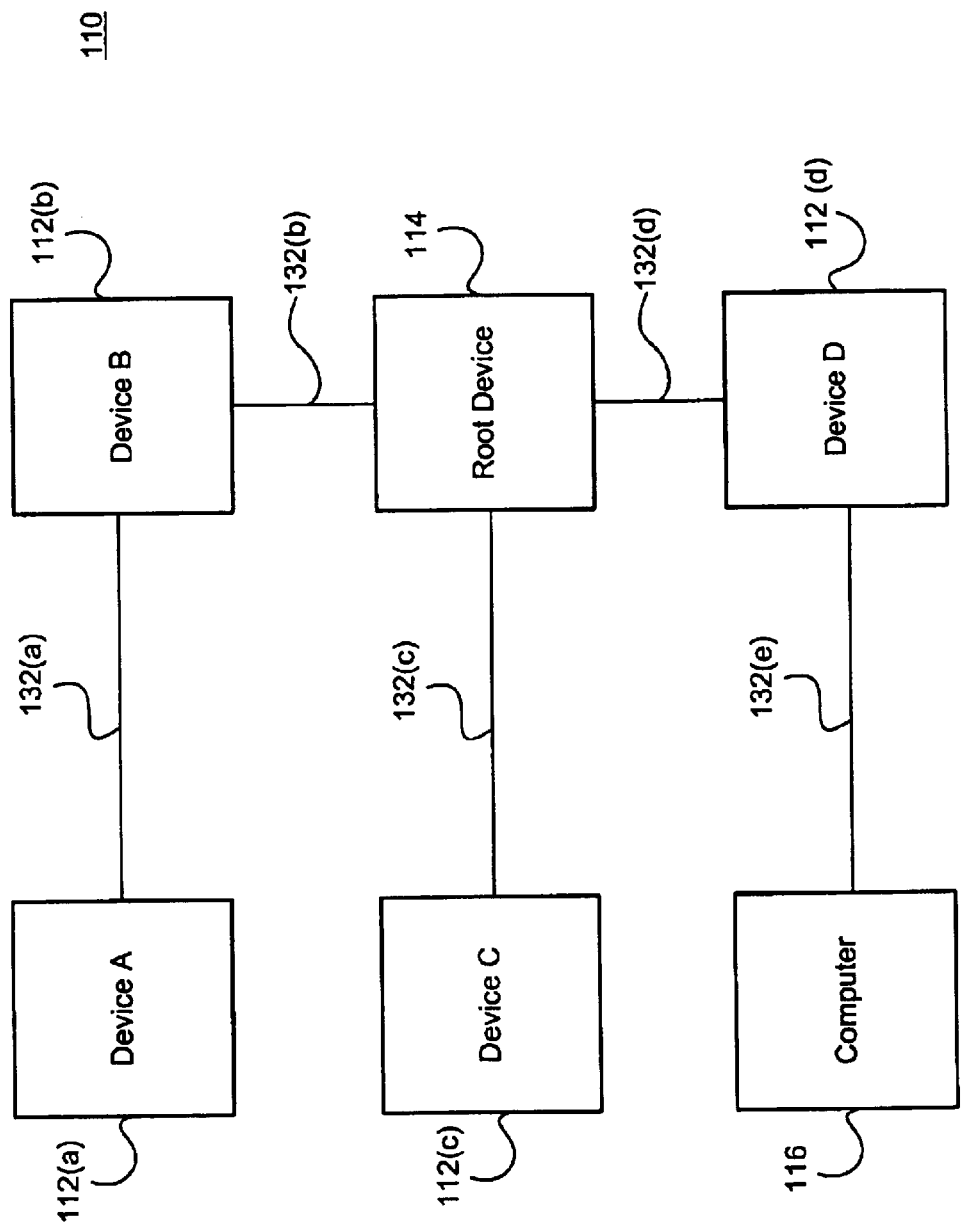
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices (device A 112(*a*), device B 112(*b*), device C 112(*c*), device D 112(*d*); and device E 112(*e*)), and computer 116. In alternate embodiments, electronic network 110 may readily be configured to include various other devices or components in addition to, or instead of, those discussed in conjunction with the FIG. 1 embodiment. In alternate embodiments, network 110 may readily be connected and configured in any other appropriate and suitable manner.

In the FIG. 1 embodiment, devices 112 and computer 116 of network 110 may alternately be implemented as any type of electronic device, including, but not limited to, personal computers, printers, digital video disc devices, television sets, audio systems, video cassette recorders, and set-top boxes for digital broadcasting. In the FIG. 1 embodiment, devices 112 and computer 116 preferably communicate with one another using a network bus 132. Network bus 132 preferably includes path 132(*a*), path 132(*b*), path 132(*c*), path 132(*d*), and path 132(*e*). For example, device B 112(*b*) is coupled to device A 112(*a*) via path 132(*a*), and to root device 114 via path 132(*b*). Similarly, device E (112(*e*) is coupled to device C 112(*c*) via path 132(*c*), and to device D 112(*d*) via path 132(*d*). In addition, device D 112(*d*) is coupled to computer 116 via path 132(*e*). In the FIG. 1 embodiment, network bus 132 is preferably implemented using a P1394 Standard for a High Performance Serial Bus, IEEE, 1995, which is hereby incorporated by reference. However, in alternate embodiments, network 110 may readily communicate and function using various other network interconnectivity methodologies which are equally within the scope of the present invention.

In the FIG. 1 embodiment, certain devices 112 and/or computer 116 in electronic network 110 may communicate with other devices 112 and/or computer 116 within network 110. For example, computer 116 may communicate with device B 112(*b*) by transmitting transfer data via cable. 132(*e*) to device D 112(*d*), which may then transmit the transfer data via cable 132(*d*) to device E (112(*e*). In response, device E 112(*e*) then may transmit the transfer data to device B 112(*b*) via cable 132(*b*).

Figure 2:
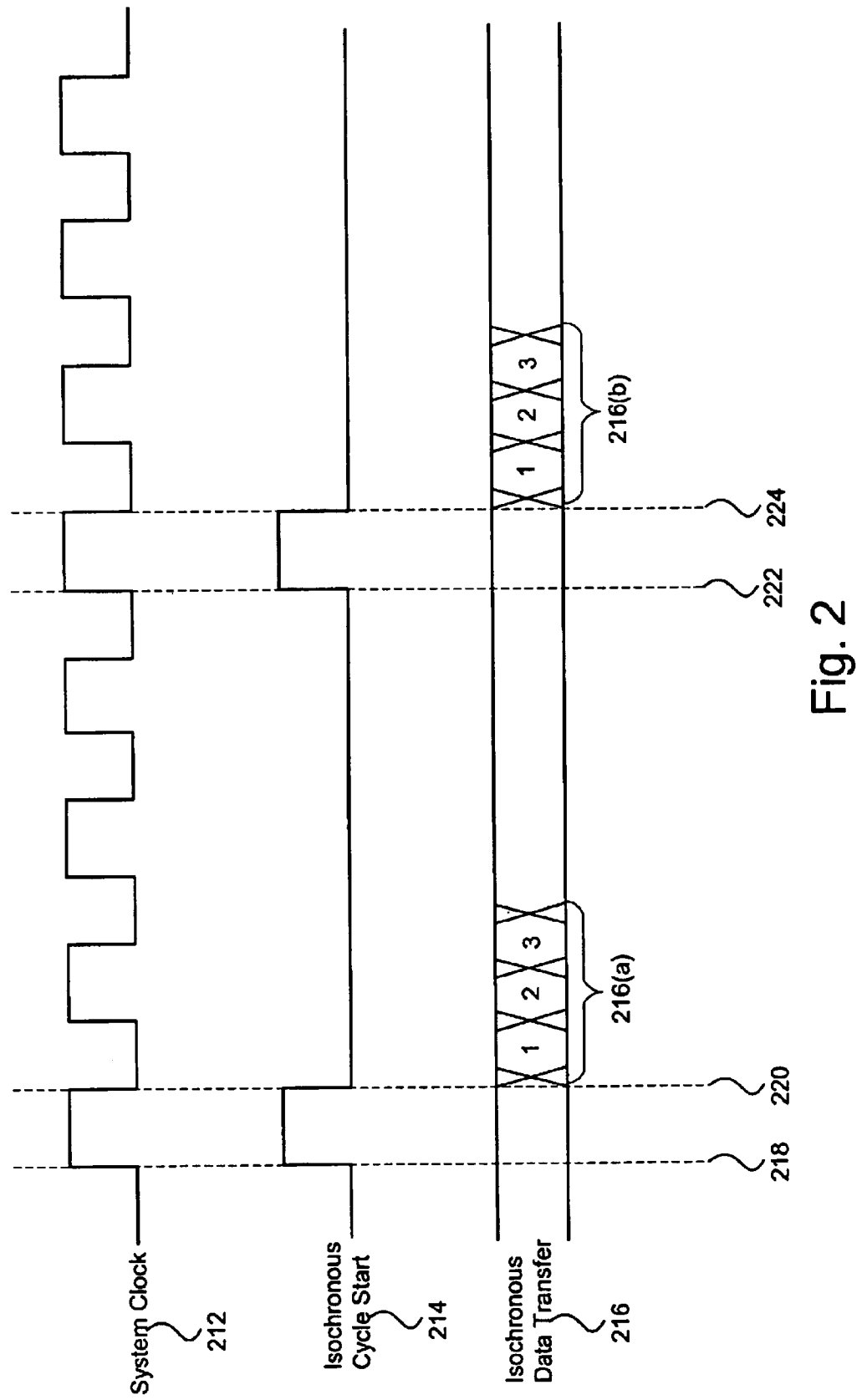
FIG. 2 is a timing diagram for one embodiment of exemplary isochronous data transfers, in accordance with the present invention.

Referring now to FIG. 2, a timing diagram for one embodiment of exemplary isochronous data transfers is shown, in accordance with one embodiment of the present invention. The FIG. 2 timing diagram includes a system clock 212, an isochronous cycle start signal 214, and an isochronous data transfer signal 216. In FIG. 2, at time 218, a first isochronous cycle start pulse changes state in synchronization with system clock 212. At time 220, the isochronous cycle start pulse changes state again, and isochronous data transfer 216(*a*) responsively occurs in a deterministic manner.

Similarly, at time 222, a second isochronous cycle start pulse changes state in synchronization with system clock 212. At time 224, the second isochronous cycle start pulse once more changes state, and isochronous data transfer 216(*b*) again occurs in a deterministic manner. Therefore, as illustrated in FIG. 2, isochronous data transfers 216(*a*) and 216(*b*) typically occur at a pre-determined time and frequency in network 110. Furthermore, network 110 may cause isochronous data transfers 216(*a*) and 216(*b*) to occur before any asynchronous data transfers because of the time-sensitive nature of isochronous data.

Figure 3:
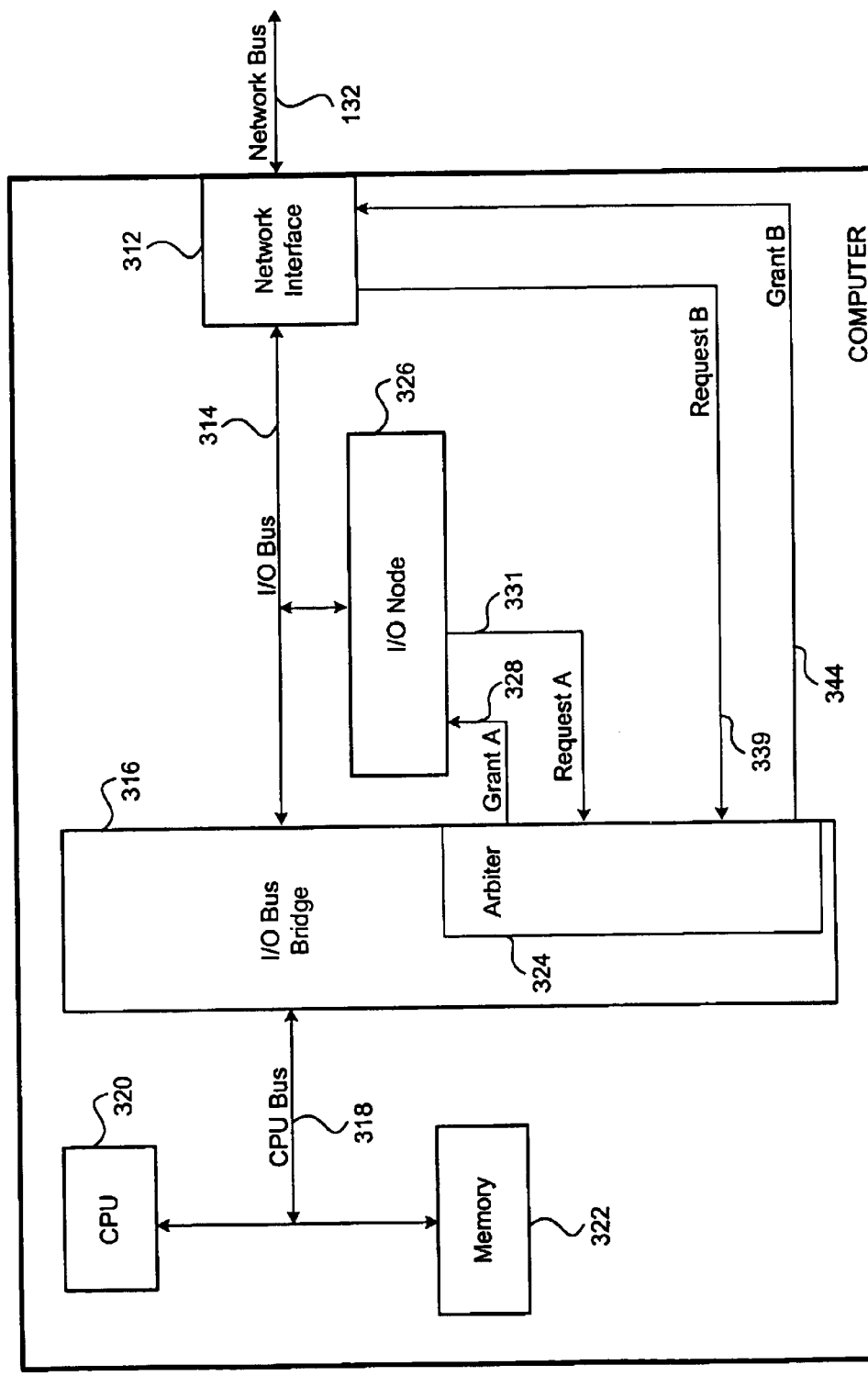
FIG. 3 is a block diagram for one embodiment of the computer shown in FIG. 1.

Referring now to FIG. 3, a block diagram for one embodiment of the FIG. 1 computer 116 is shown. In the FIG. 3 embodiment, computer 116 preferably includes an input/output (I/O) bus 314 for transferring various types of information and data to or from computer 116. In the FIG. 3 embodiment, I/O bus 314 is preferably implemented according to a peripheral component interconnect (PCI) bus specification that is further, described in "PCI Local Bus Specification," Revision 2.1s, 1995, PCI Special Interest Group, which is hereby incorporated by reference. However, in alternate embodiments, I/O bus 314 may be implemented according to any appropriate and compatible specification or standard.

In the FIG. 3 embodiment, a network interface 312 is preferably coupled to both I/O bus 314 and network bus 132 (FIG. 1) to serve as an interface for transferring isochronous data and asynchronous data between computer 116 and network 110. In addition, an input/output (I/O) node 326 is also coupled to I/O bus 314. In the FIG. 3 embodiment, I/O node 326 may be integral with computer 116, or, alternately, I/O node 326 may be external to computer 116. For purposes of illustration and clarity, the FIG. 3 computer 116 shows a single input/output (I/O) node 326, however, in alternate embodiments, computer 116 typically includes a plurality of input/output (I/O) nodes.

Input/output (I/O) node 326 preferably may include any desired type of interface, device, circuit, process, or node, including, for example, an ethernet interface, a printer device, a modem, or a graphics device. Furthermore, computer 116 may alternately be implemented as various other types of electronic devices including, for example, a set-top box or a digital television interface.

Computer 116 also includes a central processing unit (CPU) 320, a memory 322, and a CPU bus 318 that is isolated from I/O bus 314 by an I/O bus bridge 316. In practice, various types of information and data are preferably transferred by computer 116 between memory 322 and I/O bus 314 via CPU bus 318 and I/O bus bridge 316.

In the FIG. 3 embodiment, I/O bus 314 may only be accessed by a single given I/O device (network interface 312 or I/O node 326) at any particular time to transfer information between memory 322 and the given I/O device. Therefore, in order to gain control of I/O bus 314 for a data transfer operation, network interface 312 or I/O node 326 may request control of I/O bus 314 from an arbiter 324 in I/O bus bridge 316. In accordance with an arbitration algorithm, arbiter 324 responsively may grant control of I/O bus 314 to the requesting I/O device.

For example, I/O node 326 may send Request A (331) to arbiter 324 which responsively may issue Grant A (328) to I/O node 326. Alternately, network interface 312 may send Request B (339) to arbiter 324 which may responsively issue grant B (344) to network interface 312. Arbiter 324 preferably arbitrates conflicting requests from the I/O devices for control of I/O bus 314 with the use of any appropriate arbitration algorithm. For example, several possible arbitration algorithms may include a first come-first serve approach, an alternating round-robin technique, or a request prioritization method based on the importance or size of the data transfer.

Utilizing network interface 312 (or any other isochronous-capable I/O node) to transfer isochronous data over I/O bus 314 may create special requirements and consideration for obtaining timely control of I/O bus 314. Isochronous data typically is time-sensitive data which deterministically arrives at pre-determined timing intervals. Because of the time-sensitive nature of isochronous data, re-transmission of an isochronous data transfer may not be appropriate or possible. Obtaining timely access to I/O bus 314 thus becomes of heightened importance when network interface 312 requests control of I/O bus 314 to perform an isochronous data transfer.

For example, if a frame of video data does not reach a display device on network 110 until after the appropriate moment for display of that frame, then re-transmitting the delayed frame is not productive. Sources of isochronous data therefore typically do not repeat unsuccessful isochronous data transmissions. Loss of the foregoing frame of video data may likely cause unwanted jitter or breakup of the corresponding video programming.

If network interface 312 is unable to gain timely access to I/O bus 314 due to conflicting bus traffic, then significant buffer memory resources (not shown) may be required to prevent loss of the isochronous data. However, providing additional buffer memory resources may have a negative economic impact on production costs of computer 116, and controlling the buffering operations may also consume valuable processing resources in computer 116. An effective method for ensuring successful and timely completion of isochronous data transfers without requiring excess buffer memory resources is further discussed below in conjunction with FIGS. 5 through 8, in accordance with the present invention.

Figure 4:
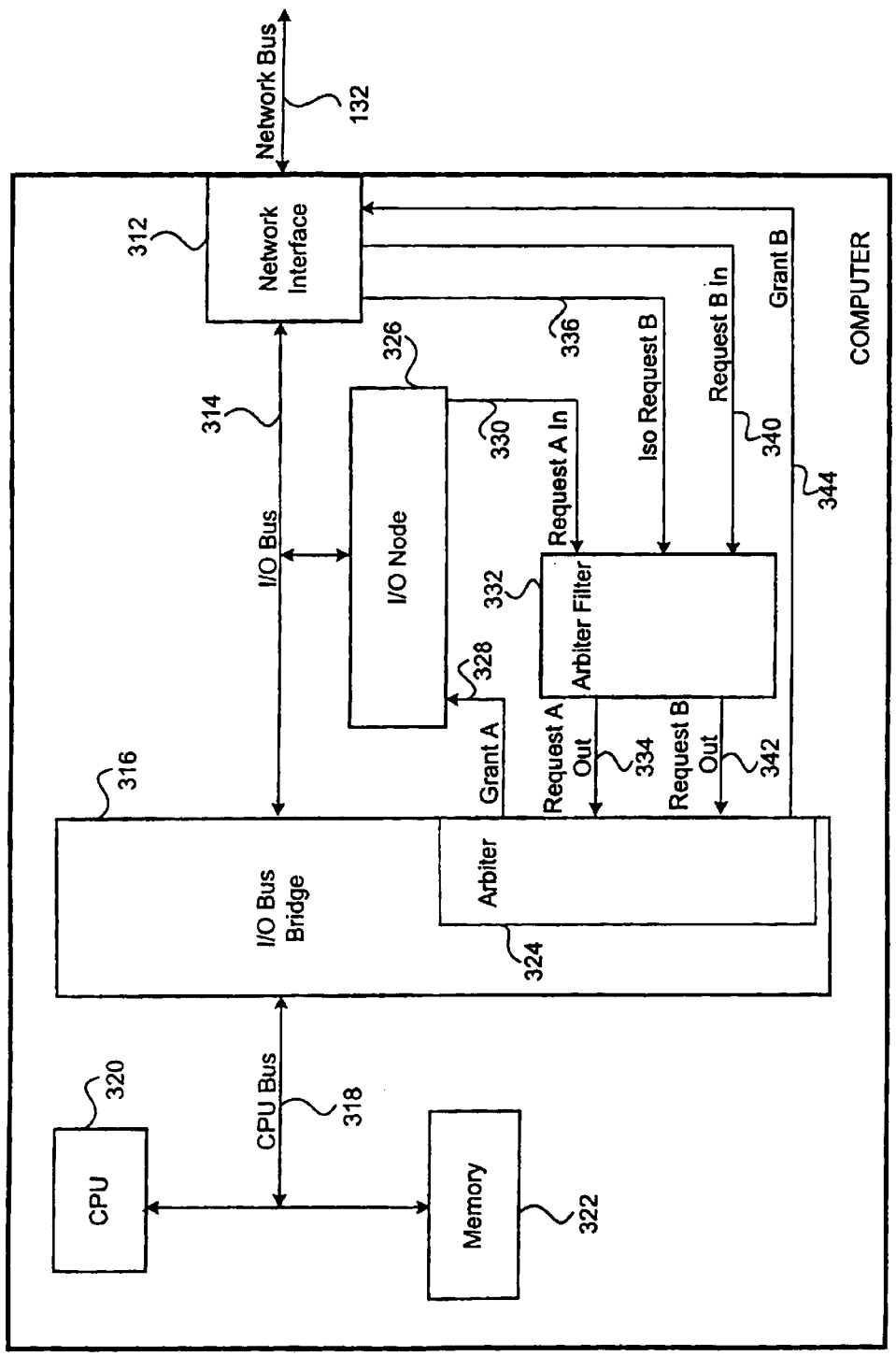
FIG. 4 is a block diagram for one embodiment of the computer of FIG. 1, in accordance with the present invention.

Referring now to FIG. 4, a block diagram for one embodiment of the FIG. 1 computer is shown, in accordance with the present invention. In the FIG. 4 embodiment, computer 116 includes various components that correspond to identically-numbered and identically-named components from the FIG. 3 embodiment of computer 116. In the FIG. 3 and FIG. 4 embodiments, components with identical reference numbers and names preferably operate in the same or similar manner, as described above in conjunction with FIG. 3.

However, in certain other embodiments, the components of FIG. 4 may alternately function in a manner different than that described in the discussion of the FIG. 3 embodiment of computer 116. Furthermore, alternate embodiments of computer 116 may readily utilize various other configurations and architectures that those disclosed and discussed in conjunction with either FIG. 3 or FIG. 4.

The FIG. 4 embodiment includes several architectural design changes that are not present in the FIG. 3 embodiment. For example, the FIG. 4 embodiment does not include a Request A (331) or a Request B (339). Instead, a Request A In 330 travels from I/O node 326 to an arbiter filter 332, and a Request A Out 334 then continues from arbiter filter 332 to arbiter 324. In the FIG. 4 embodiment, I/O node 326 preferably utilizes Request A In 330 to request control of I/O bus 314 for a non-isochronous data transfer. Similarly, a Request B In 340 travels from network interface 312 to arbiter filter 332, and a Request B Out 342 then continues from arbiter filter 332 to arbiter 324. In the FIG. 4 embodiment, network interface 312 preferably utilizes Request B In 340 to request control of I/O bus 314 for a non-isochronous data transfer.

In accordance with the present invention, the FIG. 4 embodiment also includes an isochronous transfer request (iso request B) 336 that travels from network interface 312 (or any other isochronous-capable I/O device) to arbiter filter 332. Network interface 312 may thus advantageously utilize iso request B 336 and arbiter filter 332 to establish priority over Request A In 330 and/or Request B In 340 when seeking access to I/O bus 314 for an isochronous data transfer.

In accordance with the present invention, the operation of arbiter filter 332 and iso request B 336 are transparent to arbiter 324 and I/O node 326. In addition, arbiter filter 332 may readily be added to the circuitry of computer 116 with only minimal changes to the basic system design. In certain embodiments, standard components and devices may therefore be utilized to economically and effectively implement computer 116. The operation and functionality of arbiter filter 332 and iso request B 336 are further discussed below in conjunction with FIGS. 5 through 8.

Figure 5:
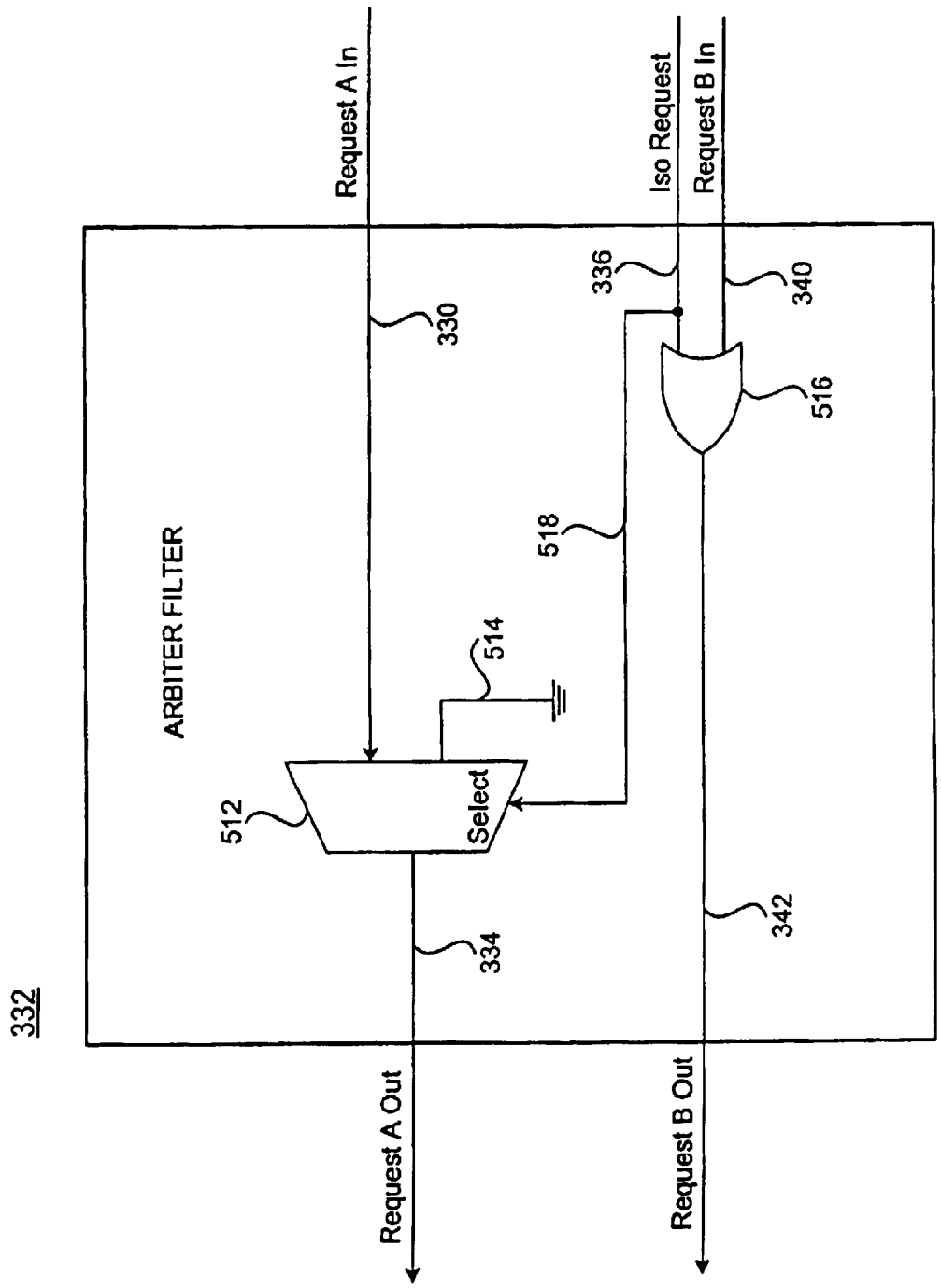
FIG. 5 is a block diagram for one embodiment of the arbiter filter of FIG. 4, in accordance with the present invention.

Referring now to FIG. 5, a block diagram for one embodiment of the FIG. 4 arbiter filter 332 is shown, in accordance with the present invention. In the FIG. 5 embodiment, Request A Out 334 and Request B Out 342 are shown as active-high digital signals. However, in alternate embodiments, Request A Out 334 and Request B Out 342 may readily function as active-low signals of any type, with corresponding alterations in the logic of arbiter filter 332. Furthermore, the FIG. 5 embodiment is presented for purposes of illustration only, and arbiter filter 332 may alternately be configured using any appropriate and compatible implementation.

In the FIG. 5 embodiment, when network interface 312 transmits iso request B 336 to OR gate 516 to request control of I/O bus 314, then the select line 518 of multiplexer 512 preferably interrupts Request A In 330 to permit the de-asserted digital low value from grounded line 514 to pass through to arbiter 324 on Request A Out 334. Request A In 330 is therefore disabled by iso request B 336. Concurrent to the disabling of Request A In 330 by iso request B 336, whenever network interface 312 transmits the foregoing iso request B 336 to OR gate 516, then a corresponding Request B Out 342 responsively requests arbiter 324 to grant control of I/O bus 314 to network interface 312 for the isochronous data transfer. The arbiter 324 may then grant I/O bus 314 to network interface 312 since Request A In 330 has been disabled.

The arbiter 324 preferably returns a grant B 344 (FIG. 4) to network interface 312 which preferably includes electronic circuitry that indicates whether grant B 344 corresponds to an iso request B 336 or a Request B In 340. In various alternate embodiments, I/O bus bridge 316 may potentially interrupt a lower-priority data transfer (currently being performed by I/O node 326) if the protocols of I/O bus 314 allow (for example, the "master" and "target" termination protocols in PCI). Network interface 312 may then immediately obtain control of I/O bus 314 to perform the higher-priority isochronous data transfer.

Figure 6:
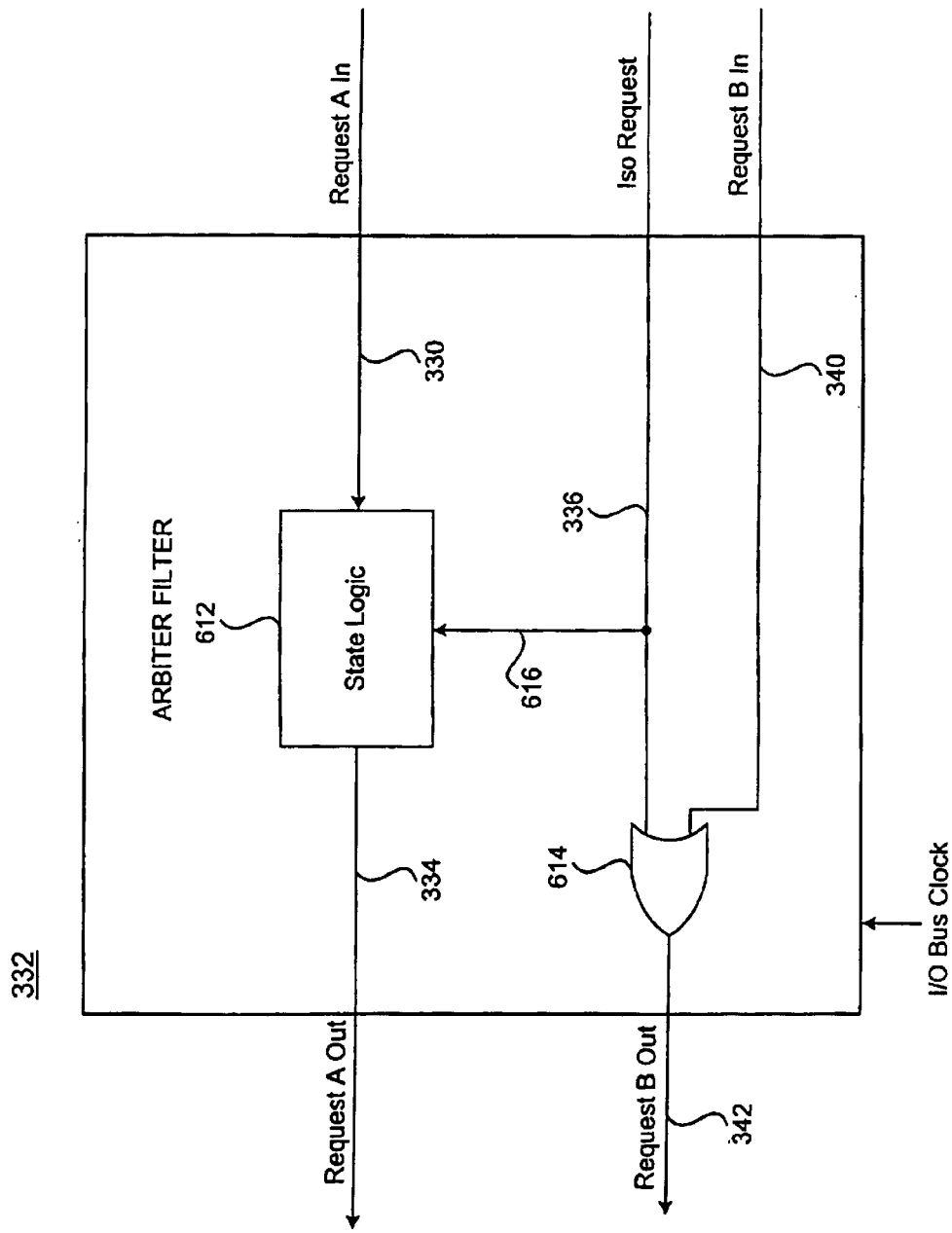
FIG. 6 is a block diagram for an alternate embodiment of the arbiter filter of FIG. 4, in accordance with the present invention.

Referring now to FIG. 6, a block diagram for an alternate embodiment of the FIG. 4 arbiter filter is shown, in accordance with the present invention. In the FIG. 6 embodiment, Request A Out 334 and Request B Out 342 are shown as active-high digital signals. However, in alternate embodiments, Request A Out 334 and Request B Out 342 may function as active-low signals of any type, with corresponding alterations in the logic of arbiter filter 332. The FIG. 6 embodiment is presented for purposes of illustration, and arbiter filter 332 may therefore be alternately configured using any appropriate and compatible implementation.

In the FIG. 6 embodiment of computer 116, the system protocol preferably does not permit immediate interruption of a request for control of I/O bus 314 until after a corresponding grant is issued by arbiter 324 to the requesting I/O device. In practice, when network interface 312 transmits iso request B 336 to OR gate 614 in order to request control of I/O bus 314, then iso line 616 provides the iso request B 336 to state logic 612. State logic 612 also receives Request A In 330 from I/O node 326.

If a previously-existing Request A In 330 is asserted when a given iso request B 336 is asserted, then state logic 612 preferably continues to assert the pre-existing Request A Out 334 until arbiter 324 returns a Grant A 328 (FIG. 4) to I/O node 326 for control of I/O bus 314. Request A In 330 then preferably toggles to a de-asserted digital low value, and, in response to the previously-received iso request B 336, state logic 612 preferably holds Request A In 330 to a de-asserted value until the current iso request B 336 is deasserted.

Concurrent to the filtering of Request A In 330 by state logic 612, whenever network interface 312 transmits the foregoing iso request B 336 to OR gate 614 to request control of I/O bus 314, then a corresponding Request B Out 342 is responsively asserted to request that arbiter 324 grant control of I/O bus 314 to network interface 312 for the isochronous data transfer.

Figure 7:
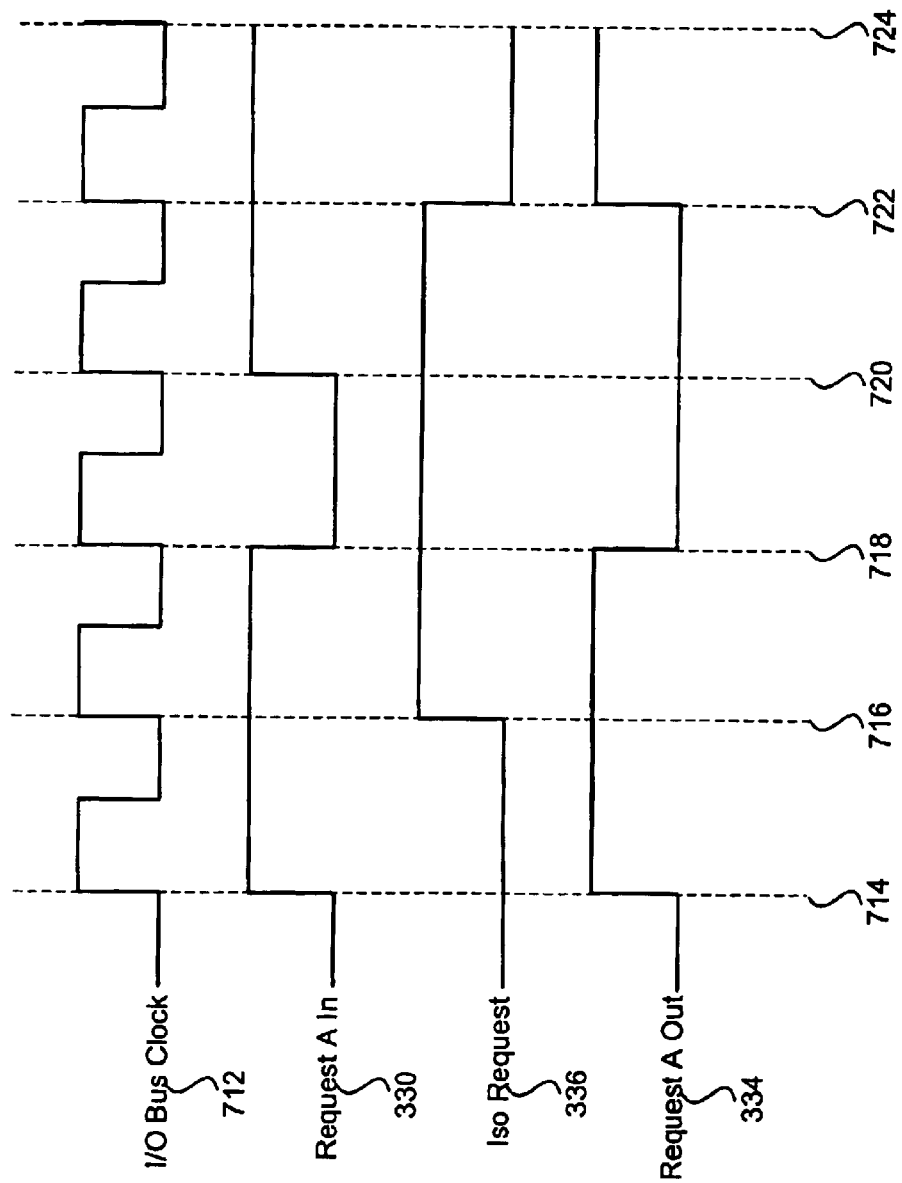
FIG. 7 is a timing diagram for an exemplary isochronous request sequence, in accordance with one embodiment of the present invention.

Referring now to FIG. 7, a timing diagram for an exemplary isochronous request sequence is shown, in accordance with the FIG. 6 embodiment of computer 116. The FIG. 7 timing diagram includes an I/O bus clock 712, a Request A In 330, an iso request B 336, and a Request A Out 334. The FIG. 7 timing diagram illustrates one exemplary sequence for state logic 612. In alternate embodiments, state logic 612 may readily function with various other waveforms and waveform timing in addition to, or instead of, those shown in the FIG. 7 embodiment.

In the FIG. 7 embodiment, at time 714, I/O node 326 asserts Request A In 330 to request control of I/O bus 314. Since iso request B 336 is currently de-asserted, state logic 612 responsively asserts Request A Out 334. At time 716, network interface 312 asserts iso request B 336. However, according to the FIG. 6 system protocol of arbiter filter 332, state logic 612 maintains Request A In 330 in an asserted state.

At time 718, preferably after receiving Grant A 328 from arbiter 324, I/O node 326 de-asserts Request A In 330, and state logic 612 responsively de-asserts Request A Out 334. At time 720, I/O node 326 again asserts Request A In 330. However, in accordance with the present invention, since iso request B 336 is asserted at time 720, state logic 612 maintains Request A Out 334 in a de-asserted state.

Finally, at time 722, preferably after receiving grant B 344 from arbiter 324, network interface 312 de-asserts iso request B 336, and state logic 612 asserts Request B Out 342 in response to the previously-asserted state of Request A In 330. In the FIG. 6 embodiment, state logic 612 of arbiter filter 332 therefore does not permit immediate interruption of a request for control of I/O bus 314 until after a corresponding grant is issued by arbiter 324 to the requesting I/O device.

Figure 8:
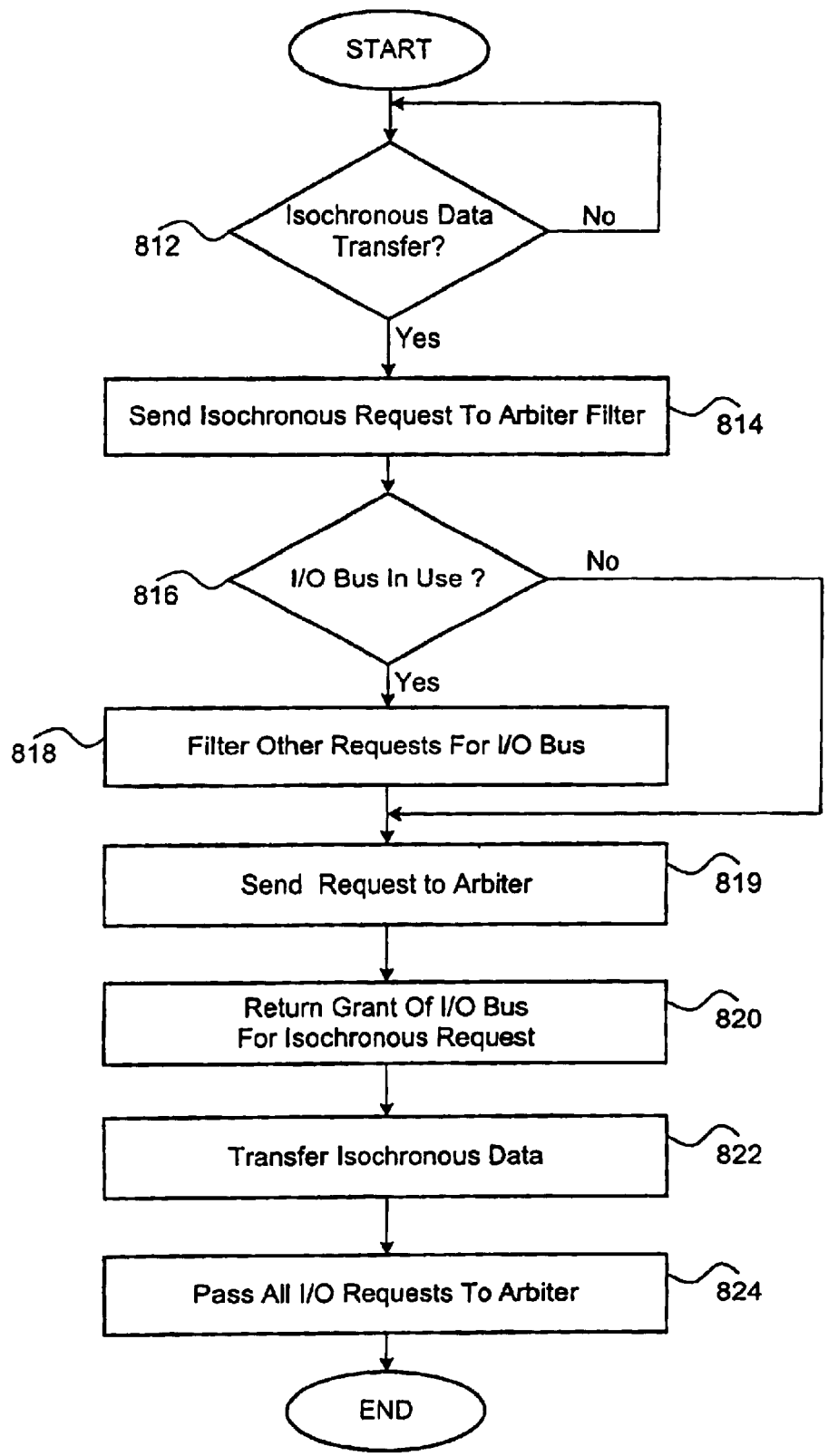
FIG. 8 is a flowchart of method steps for performing an isochronous data transfer, in accordance with one embodiment of the present invention.

Referring now to FIG. 8, a flowchart of method steps for performing an isochronous data transfer is shown, in accordance with one embodiment of the present invention. The FIG. 8 embodiment is discussed in the context of an isochronous data transfer performed with network interface 312. However, in alternate embodiments, the present invention is contemplated for use with any isochronous-capable device coupled to I/O bus 314.

In the FIG. 8 embodiment, initially, network interface 312 determines whether an isochronous data transfer is required by computer 116. If an isochronous data transfer is required, then network interface 312 responsively sends an iso request B 336 to arbiter filter 332 to gain control of I/O bus 314. In step 816, arbiter filter 332 determines whether I/O bus 314 is presently in use by analyzing whether any conflicting request lines (for example, Request A In 330) are currently asserted to gain control of I/O bus 314.

If no conflicting requests are currently asserted, then the FIG. 8 process advances to step 819. However, if one or more conflicting requests are currently asserted to gain control of I/O bus 314, then, in step 818, arbiter filter 324 preferably filters the other conflicting requests to thereby gain priority for control of I/O bus 314. The present invention may utilize any suitable techniques for obtaining priority over competing requests for control of I/O bus 314, including those methods discussed above in conjunction with FIGS. 4 through 7.

In step 819, in response to the foregoing iso request B 336, arbiter filter 332 sends a Request B Out 342 to arbiter 324. Then, in step 820, arbiter 324 preferably returns a grant (grant B 344) for control of I/O bus 314 to network interface 312. Then, in step 822, computer 116 performs the requested isochronous data transfer. Finally, in step 824, arbiter filter 332 resumes passing all requests for control of I/O bus 314 to arbiter 324, and the FIG. 8 process terminates.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for effectively performing a high-priority data transfer operation, comprising:
    a device bus configured to transfer data according to a device bus protocol;
    a first bus node coupled to said device bus for performing a low-priority data transfer operation;
    a second bus node coupled to said device bus, said second bus node generating a special request to obtain a priority control over said device bus for performing said high-priority data transfer operation; and
    an arbiter configured to immediately interrupt said low-priority data transfer operation after receiving said special request from an arbiter filter that is separately and transparently implemented with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation.

2. The system of claim 1 wherein said arbiter immediately interrupts said low-priority data transfer operation after receiving said special request from said second bus node, said low-priority data transfer operation being in an incomplete transfer state when interrupted by said arbiter, said high-priority data transfer operation beginning immediately after said low-priority data transfer operation is interrupted.

3. The system of claim 1 wherein said device bus protocol supports said arbiter immediately interrupting said low-priority data transfer operation to perform said high-priority data transfer operation in a guaranteed and deterministic manner after said second bus node generates said special request to perform said high-priority data transfer operation.

4. The system of claim 1 wherein said high-priority data transfer operation includes a time-critical isochronous data transfer operation.

5. The system of claim 1 wherein said device bus, said first bus node, and said second bus node are coupled to one of a computer device, a set-top box, a digital television device, and a consumer electronic device.

6. The system of claim 1 wherein said device bus is an input/output bus that is implemented according to a Peripheral Component Interconnect (PCI) standard.

7. The system of claim 1 wherein said first bus node includes an input/output device that may be implemented as one of a printer device, an ethernet interface, a graphics device, or a modem.

8. The system of claim 1 wherein said second bus node includes a network interface that is coupled to a network bus which is implemented according to an IEEE 1394 serial bus interconnectivity standard.

9. The system of claim 1 wherein said special request includes an isochronous request to immediately gain said priority control over a conflicting request from said first bus node to access said device bus.

10. The system of claim 9 wherein said conflicting request is disabled by said arbiter filter in response to said isochronous request to thereby immediately cause said arbiter to grant said priority control of said device bus to said second bus node for performing said high-priority data transfer operation.

11. A system for effectively performing a high-priority data transfer operation, comprising:
    a device bus configured to transfer data according to a device bus protocol;
    a first bus node coupled to said device bus for performing a low-priority data transfer operation;
    a second bus node coupled to said device bus, said second bus node generating a special request to obtain a priority control over said device bus for performing said high-priority data transfer operation; and
    an arbiter configured to immediately interrupt said low-priority data transfer operation after receiving said special request from an arbiter filter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said first bus node issuing a Request A In to said arbiter filter for requesting control of said device bus, said arbiter filter responsively filtering said request A In to generate a Request A Out to said arbiter.

12. The system of claim 11 wherein said second bus node issues said isochronous request to said arbiter filter for requesting control of said device bus, and wherein said arbiter filter responsively filters said Request A In to immediately disable a Request A Out to said arbiter.

13. A system for effectively performing a high-priority data transfer operation, comprising:
    a device bus configured to transfer data according to a device bus protocol;
    a first bus node coupled to said device bus for performing a low-priority data transfer operation;
    a second bus node coupled to said device bus, said second bus node generating a special request to obtain a priority control over said device bus for performing said high-priority data transfer operation; and an arbiter configured to immediately interrupt said low-priority data transfer operation after receiving said special request from an arbiter filter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said second bus node issuing said isochronous request to said arbiter filter for requesting control of said device bus, said arbiter filter immediately transmitting a Request B Out to said arbiter.

14. A system for effectively performing a high-priority data transfer operation, comprising:

a device bus configured to transfer data according to a device bus protocol;

a first bus node coupled to said device bus for performing a low-priority data transfer operation;

a second bus node coupled to said device bus, said second bus node generating a special request to obtain a priority control over said device bus for performing said high-priority data transfer operation; and an arbiter configured to immediately interrupt said low-priority data transfer operation after receiving said special request from an arbiter filter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said isochronous request controlling a select line of a multiplexer in said arbiter filter to thereby immediately disable a Request A In from said first bus node.

15. A system for effectively performing a high-priority data transfer operation, comprising:

a device bus configured to transfer data according to a device bus protocol;

a first bus node coupled to said device bus for performing a low-priority data transfer operation;

a second bus node coupled to said device bus, said second bus node generating a special request to obtain a priority control over said device bus for performing said high-priority data transfer operation; and an arbiter configured to immediately interrupt said low-priority data transfer operation after receiving said special request from an arbiter filter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said isochronous request and a request B In from said second bus node being provided to an OR gate in said arbiter filter to generate a Request B Out to said arbiter.

16. A system for effectively performing a high-priority data transfer operation, comprising:

a device bus configured to transfer data according to a device bus protocol;

a first bus node coupled to said device bus for performing a low-priority data transfer operation;

a second bus node coupled to said device bus, said second bus node generating a special request to obtain a priority control over said device bus for performing said high-priority data transfer operation; and an arbiter configured to immediately interrupt said low-priority data transfer operation after receiving said special request from an arbiter filter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said isochronous request controlling state logic in said arbiter filter to thereby immediately disable a Request A In from said first bus node.

17. The system of claim 16 wherein said arbiter follows said device bus protocol for immediately interrupting said low-priority data transfer operation of said first bus node to grant said priority control to said second bus node in response to said isochronous request.

18. The system of claim 10 wherein functions of said arbiter filter and said isochronous request are transparent to said first bus node and said arbiter.

19. The system of claim 1 further comprising a plurality of input/output nodes that are coupled to said device bus.

20. The system of claim 10 wherein said arbiter filter and said isochronous request are added to a computer device that is implemented with standardized electronic components without altering a basic system architecture of said computer device.

21. A method for effectively performing a high-priority data transfer operation, comprising the steps of:

providing a device bus configured to transfer data according to a device bus protocol;

connecting a first bus node to said device bus for performing a low-priority data transfer operation;

generating a special request with a second bus node to obtain a priority control over said device bus for performing said high-priority data transfer operation; and interrupting said low-priority data transfer operation with an arbiter immediately after receiving said special request from an arbiter filter that is separately and transparently implemented with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation.

22. The method of claim 21 wherein said arbiter immediately interrupts said low-priority data transfer operation after receiving said special request from said second bus node, said low-priority data transfer operation being in an incomplete transfer state when interrupted by said arbiter, said high-priority data transfer operation beginning immediately after said low-priority data transfer operation is interrupted.

23. The method of claim 21 wherein said device bus protocol supports said arbiter immediately interrupting said low-priority data transfer operation to perform said high-priority data transfer operation in a guaranteed and deterministic manner after said second bus node generates said special request to perform said high-priority data transfer operation.

24. The method of claim 21 wherein said high-priority data transfer operation includes a time-critical isochronous data transfer operation.

25. The method of claim 21 further comprising the step of coupling said device bus, said first bus node, and said second bus node to one of a computer device, a set-top box, a digital television device, and a consumer electronic device.

26. The method of claim 21 wherein said device bus is an input/output bus that is implemented according to a Peripheral Component Interconnect (PCI) standard.

27. The method of claim 21 wherein said first bus node includes an input/output device that may be implemented as one of a printer device, an ethernet interface, a graphics device, or a modem.

28. The method of claim 21 further comprising the step of coupling a network interface of said second bus node to a network bus which is implemented according to an IEEE 1394 serial bus interconnectivity standard.

29. The method of claim 21 wherein said special request includes an isochronous request to immediately gain said priority control over a conflicting request from said first bus node to access said device bus.

30. The method of claim 29 wherein said conflicting request is disabled by said arbiter filter in response to said isochronous request to thereby immediately cause said arbiter to grant said priority control of said device bus to said second bus node for performing said high-priority data transfer operation.

31. A method for effectively performing a high-priority data transfer operation, comprising the steps of:

providing a device bus configured to transfer data according to a device bus protocol;

connecting a first bus node to said device bus for performing a low-priority data transfer operation;

generating a special request with a second bus node to obtain a priority control over said device bus for performing said high-priority data transfer operation; and interrupting said low-priority data transfer operation with an arbiter immediately after receiving said special request from an arbiter filter that is separately and transparently implemented with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said first bus node issuing a Request A In to said arbiter filter for requesting control of said device bus, said arbiter filter responsively filtering said Request A In to generate a Request A Out to said arbiter.

32. The method of claim 31 wherein said second bus node issues said isochronous request to said arbiter filter for requesting control of said device bus, and wherein said arbiter filter responsively filters said Request A In to immediately disable a Request A Out to said arbiter.

33. A method for effectively performing a high-priority data transfer operation, comprising the steps of:

providing a device bus configured to transfer data according to a device bus protocol;

connecting a first bus node to said device bus for performing a low-priority data transfer operation;

generating a special request with a second bus node to obtain a priority control over said device bus for performing said high-priority data transfer operation; and interrupting said low-priority data transfer operation with an arbiter immediately after receiving said special request from an arbiter filter that is separately and transparently implemented with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said second bus node issuing said isochronous request to said arbiter filter for requesting control of said device bus, said arbiter filter immediately transmitting a Request B Out to said arbiter.

34. A method for effectively performing a high-priority data transfer operation, comprising the steps of:

providing a device bus configured to transfer data according to a device bus protocol;

connecting a first bus node to said device bus for performing a low-priority data transfer operation;

generating a special request with a second bus node to obtain a priority control over said device bus for performing said high-priority data transfer operation; and interrupting said low-priority data transfer operation with an arbiter immediately after receiving said special request from an arbiter filter that is separately and transparently implemented, with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said isochronous request controlling a select line of a multiplexer in said arbiter filter to thereby immediately disable a Request A In from said first bus node.

35. A method for effectively performing a high-priority data transfer operation, comprising the steps of:

providing a device bus configured to transfer data according to a device bus protocol;

connecting a first bus node to said device bus for performing a low-priority data transfer operation;

generating a special request with a second bus node to obtain a priority control over said device bus for performing said high-priority data transfer operation; and interrupting said low-priority data transfer operation with an arbiter immediately after receiving said special request from an arbiter filter that is separately and transparently implemented with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said isochronous request and a Request B In from said second bus node being provided to an OR gate in said arbiter filter to generate a Request B Out to said arbiter.

36. A method for effectively performing a high-priority data transfer operation, comprising the steps of:

providing a device bus configured to transfer data according to a device bus protocol;

connecting a first bus node to said device bus for performing a low-priority data transfer operation;

generating a special request with a second bus node to obtain a priority control over said device bus for performing said high-priority data transfer operation; and interrupting said low-priority data transfer operation with an arbiter immediately after receiving said special request from an arbiter filter that is separately and transparently implemented with respect to said arbiter, said special request being an isochronous request that controls logic in said arbiter filter to immediately disable a non-isochronous request from said first bus node, said arbiter granting said priority control over said device bus to guarantee a timely completion of said high-priority data transfer operation, said special request including an isochronous request to immediately gain said priority control over a conflicting request from said first bus node to access said device bus, said conflicting request being disabled by said arbiter filter in response to said isochronous request to thereby immediately cause said arbiter to grant said priority control of said device bus to said second bus node for performing said high-priority data transfer operation, said isochronous request controlling state logic in said arbiter filter to thereby immediately disable a Request A In from said first bus node.

37. The method of claim 36 wherein said arbiter follows said device bus protocol for immediately interrupting said low-priority data transfer operation of said first bus node to grant said priority control to said second bus node in response to said isochronous request.

38. The method of claim 30 wherein functions of said arbiter filter and said isochronous request are transparent to said first bus node and said arbiter.

39. The method of claim 21 further comprising a plurality of input/output nodes that are coupled to said device bus.

40. The method of claim 30 wherein said arbiter filter and said isochronous request are added to a computer device that is implemented with standardized electronic components without altering a basic system architecture of said computer device.

* * * * *